US012774899B2

(12) United States Patent
Ladeia Rodrigues

(10) Patent No.: US 12,774,899 B2
(45) Date of Patent: Oct. 27, 2026

(54) SYSTEMS AND METHODS FOR DETECTING A HARD POINT BETWEEN ROADS AND MAPPING AN AREA

(71) Applicant: Toyota Jidosha Kabushiki Kaisha, Toyota (JP)

(72) Inventor: Jose Felix Ladeia Rodrigues, Sunnyvale, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 142 days.

(21) Appl. No.: 18/428,008

(22) Filed: Jan. 31, 2024

(65) Prior Publication Data

US 2025/0244142 A1 Jul. 31, 2025

(51) Int. Cl.
*G01C 21/00* (2006.01)

(52) U.S. Cl.
CPC ..... *G01C 21/3822* (2020.08); *G01C 21/3841* (2020.08)

(58) Field of Classification Search
CPC ........................ G01C 21/3822; G01C 21/3841
USPC .......................................................... 701/445
See application file for complete search history.

(56) References Cited

U.S. PATENT DOCUMENTS

2013/0326380 A1* 12/2013 Lai ...................... G06F 3/04815 715/765
2013/0328883 A1* 12/2013 Sethia ................... G06T 7/0004 345/441
2018/0130221 A1 5/2018 Kim et al.
2022/0348227 A1 11/2022 Foster et al.
2023/0083343 A1 3/2023 Chen

FOREIGN PATENT DOCUMENTS

CN 104537342 A 4/2015
CN 110443822 A 11/2019
CN 114519700 A 5/2022
CN 114608602 A 6/2022
CN 115116018 A 9/2022

(Continued)

OTHER PUBLICATIONS

Petek et al., "Robust Monocular Localization in Sparse HD Maps Leveraging Multi-Task Uncertainty Estimation," 2022 International Conference on Robotics and Automation (ICRA), Philadelphia, PA, USA, 2022, pp. 4163-4169.

*Primary Examiner* — Helal A Algahaim
(74) *Attorney, Agent, or Firm* — Christopher G. Darrow; Darrow Mustafa PC

(57) ABSTRACT

Systems, methods, and other embodiments described herein relate to detecting a hard point between different roads using a sliding window for searching a raster representation of an area. In one embodiment, a method includes identifying road boundaries from a raster representation about different roads generated with vehicle data, the road boundaries including a left boundary and a right boundary of the different roads. The method also includes searching the raster representation and the vehicle data with a sliding window for a hard point using the road boundaries and a road graph describing a layout of the different roads. The method also includes detecting the hard point at a convergence area between the left boundary and the right boundary among the sliding window and generating a map including the hard point.

20 Claims, 6 Drawing Sheets

(56) References Cited

FOREIGN PATENT DOCUMENTS

| | | | |
|---|---|---|---|
| CN | 115346183 | A | 11/2022 |
| CN | 117197764 | A | 12/2023 |
| WO | 2022213373 | A1 | 10/2022 |

* cited by examiner

SYSTEMS AND METHODS FOR DETECTING A HARD POINT BETWEEN ROADS AND MAPPING AN AREA

TECHNICAL FIELD

The subject matter described herein relates, in general, to detecting a hard point on a road, and, more particularly, to detecting the hard point between different roads using a sliding window that searches a raster representation.

BACKGROUND

Vehicles can be equipped with sensors that facilitate detecting other vehicles, obstacles, pedestrians, and additional aspects of a surrounding environment. For example, a vehicle uses a light detection and ranging (LIDAR) sensor that scans the surrounding environment with light, while logic associated with the LIDAR analyzes acquired data to detect object presence and other features of the surrounding environment. In further examples, cameras acquire information about the surrounding environment from which a system detects aspects of the surrounding environment. This vehicle data can be useful in various circumstances for improving perceptions of the surrounding environment so that navigation systems can map an area and assist other systems (e.g., automated driving systems) to safely execute tasks.

In various implementations, a navigation system collects vehicle data from a fleet about roads. For example, the navigation system processes images and identifies lane markings about the roads for generating maps locally, remotely, etc. In certain scenarios, roads (e.g., highways) have converging lanes that are difficult for the navigation systems to identify. The converging lanes can have physical and non-physical boundaries between lane markings having various geometries. Therefore, navigation systems encounter challenges with generating accurate maps having detailed geometries about roads including convergence areas, thereby reducing safety for tasks (e.g., automated driving) relying on the maps.

SUMMARY

In one embodiment, example systems and methods relate to detecting a hard point between different roads using a sliding window for searching a raster representation of an area. In various implementations, systems generate maps from vehicle data having road boundaries and lane lines. However, these maps can have missing information from vehicle data that is erroneous and lack information about physical boundaries (e.g., a hard point). For example, a generated map lacks information about a hard point where roads having different geometries and structures converge. Accordingly, systems performing tasks that demand road geometries and structures with hard points that are detailed and reliable face unsafe conditions.

Therefore, in one embodiment, a detection system identifies a hard point for generating a map between road boundaries with an algorithm that implements a sliding window using vehicle data. Here, the hard point can be a physical boundary at a road junction between different roads merging, diverging, etc. The detection system can generate a raster representation that maps keypoints having geographical coordinates detected from a vehicle fleet to identify the road boundaries for the different roads. As such, searching the raster representation and the vehicle data with the sliding window may indicate the hard point using the road boundaries for areas exhibiting changing road structures and lane types. For example, the detection system detects a hard point where road structures from different roads converge at a road junction within the sliding window. Therefore, the detection system improves mapping by accurately identifying a hard point using a sliding window that searches vehicle data for a convergence area, thereby improving map details and tasks that demand accurate road information.

In one embodiment, a detection system that detects a hard point between different roads using a sliding window for searching a raster representation of an area is disclosed. The detection system includes a memory having instructions that, when executed by a processor, cause the processor to identify road boundaries from a raster representation about different roads generated with vehicle data, the road boundaries including a left boundary and a right boundary of the different roads. The instructions also include instructions to search the raster representation and the vehicle data with a sliding window for a hard point using the road boundaries and a road graph that describes a layout of the different roads. The instructions also include instructions to detect the hard point at a convergence area between the left boundary and the right boundary among the sliding window and generate a map including the hard point.

In one embodiment, a non-transitory computer-readable medium that detects a hard point between different roads using a sliding window for searching a raster representation of an area and including instructions that when executed by a processor cause the processor to perform one or more functions is disclosed. The instructions include instructions to identify road boundaries from a raster representation about different roads generated with vehicle data, the road boundaries including a left boundary and a right boundary of the different roads. The instructions also include instructions to search the raster representation and the vehicle data with a sliding window for a hard point using the road boundaries and a road graph that describes a layout of the different roads. The instructions also include instructions to detect the hard point at a convergence area between the left boundary and the right boundary among the sliding window and generate a map including the hard point.

In one embodiment, a method for detecting a hard point between different roads using a sliding window for searching a raster representation of an area is disclosed. In one embodiment, the method includes identifying road boundaries from a raster representation about different roads generated with vehicle data, the road boundaries including a left boundary and a right boundary of the different roads. The method also includes searching the raster representation and the vehicle data with a sliding window for a hard point using the road boundaries and a road graph describing a layout of the different roads. The method also includes detecting the hard point at a convergence area between the left boundary and the right boundary among the sliding window and generating a map including the hard point.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with detecting a hard point between different roads using a sliding window for searching a raster representation of an area are disclosed herein. Roads in an area having lanes that converge at a junction can include a soft point, a taper point, a hard point, etc. Lanes can converge using lane markers that are painted on the roads and/or physical boundaries between lanes (e.g., multiple highways merging). A soft point is a painted boundary where lanes merge. A taper point is lanes joining without lane markers. A hard point is a junction having a physical boundary, such as lane dividers that are concrete merging. In various implementations, systems collect vehicle data to identify and map junctions on a road. However, these systems may encounter difficulties distinguishing a hard point from other junctions due to data discrepancies, sensor errors, construction, etc. As such, maps of certain areas have deficient information without hard points that causes unsafe conditions for systems such as automated driving and navigation that rely on maps having detailed and reliable road structures.

Therefore, in one embodiment, a detection system locates a hard point at a junction by generating a raster representation of an area through acquiring vehicle data and searching the raster representation with a sliding window. As such, generated maps are improved as the hard point represents a fundamental point and the junction between roads and lane information is derivable from the hard point. In particular, the detection system may identify left and right boundaries and a road graph describing a layout of the different roads. Incrementally searching the raster representation and the vehicle data can locate lane groups having constant qualities associated with the different roads. In this way, a hard point can be detected at a convergence area between the left boundary and the right boundary of particular roads among the sliding window. In one approach, the detection system marks the hard point on the raster representation where patterns associated with the lane groups transition (e.g., merging, diverging, etc.) for map development. Accordingly, the detection system locates hard points and junctions in areas using a sliding window that searches vehicle data for a convergence area and changing lane groups, thereby assisting the generation of detailed maps and improving advanced tasks that demand road information that is rich.

Figure 1:
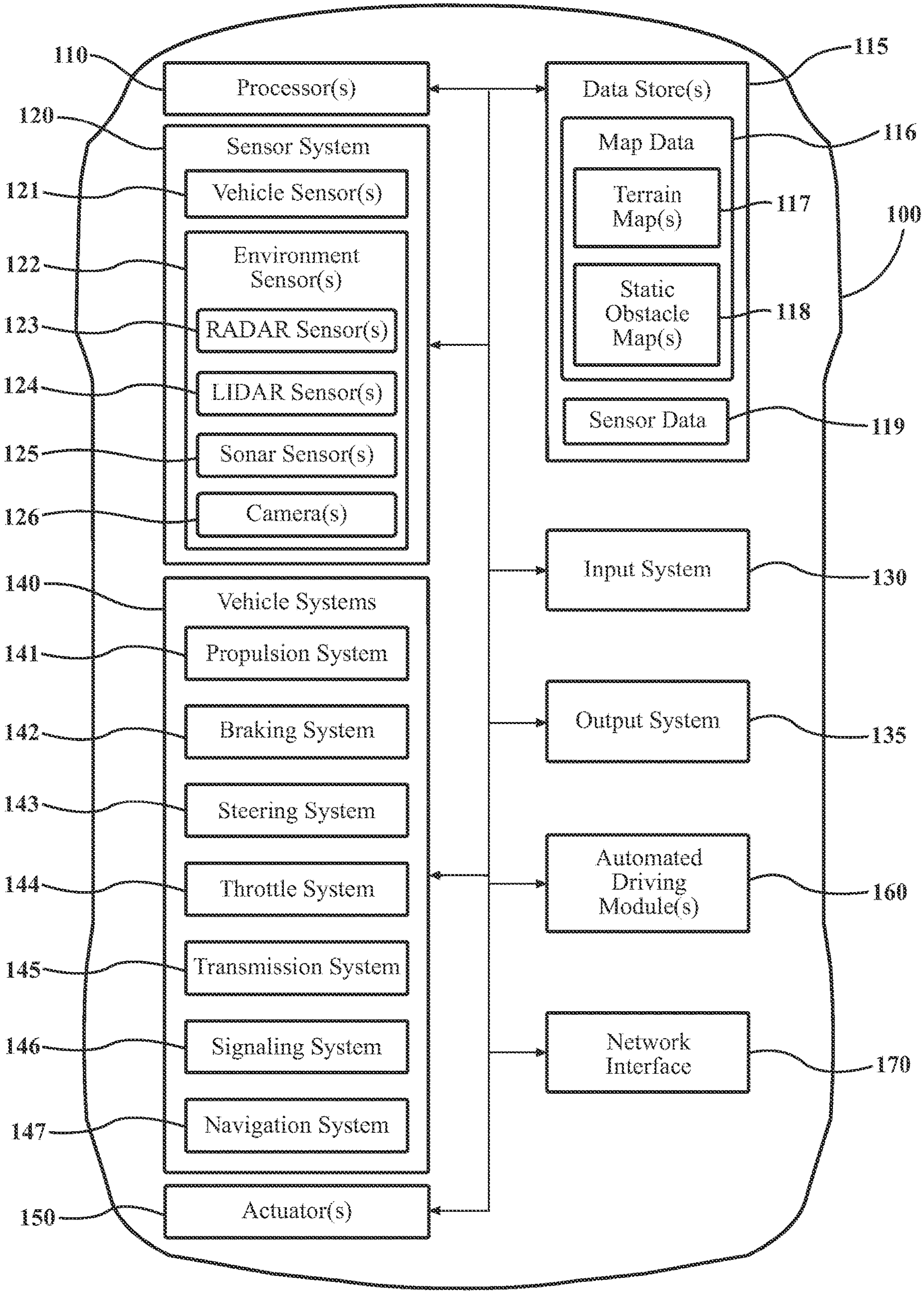
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, a detection system 200 acquires vehicle data 270 from road-side units (RSU), consumer electronics (CE), mobile devices, robots, drones, and so on that benefit from the functionality discussed herein associated with detecting a hard point between different roads using a sliding window for searching a raster representation of an area.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a network interface 170 (e.g., a wireless transceiver, a wireless protocol, etc.) that communicates the sensor data 119 to the detection system 200 that is implemented to perform methods and other functions as disclosed herein relating to detecting a hard point between different roads using a sliding window for searching a raster representation of an area.

Figure 2:
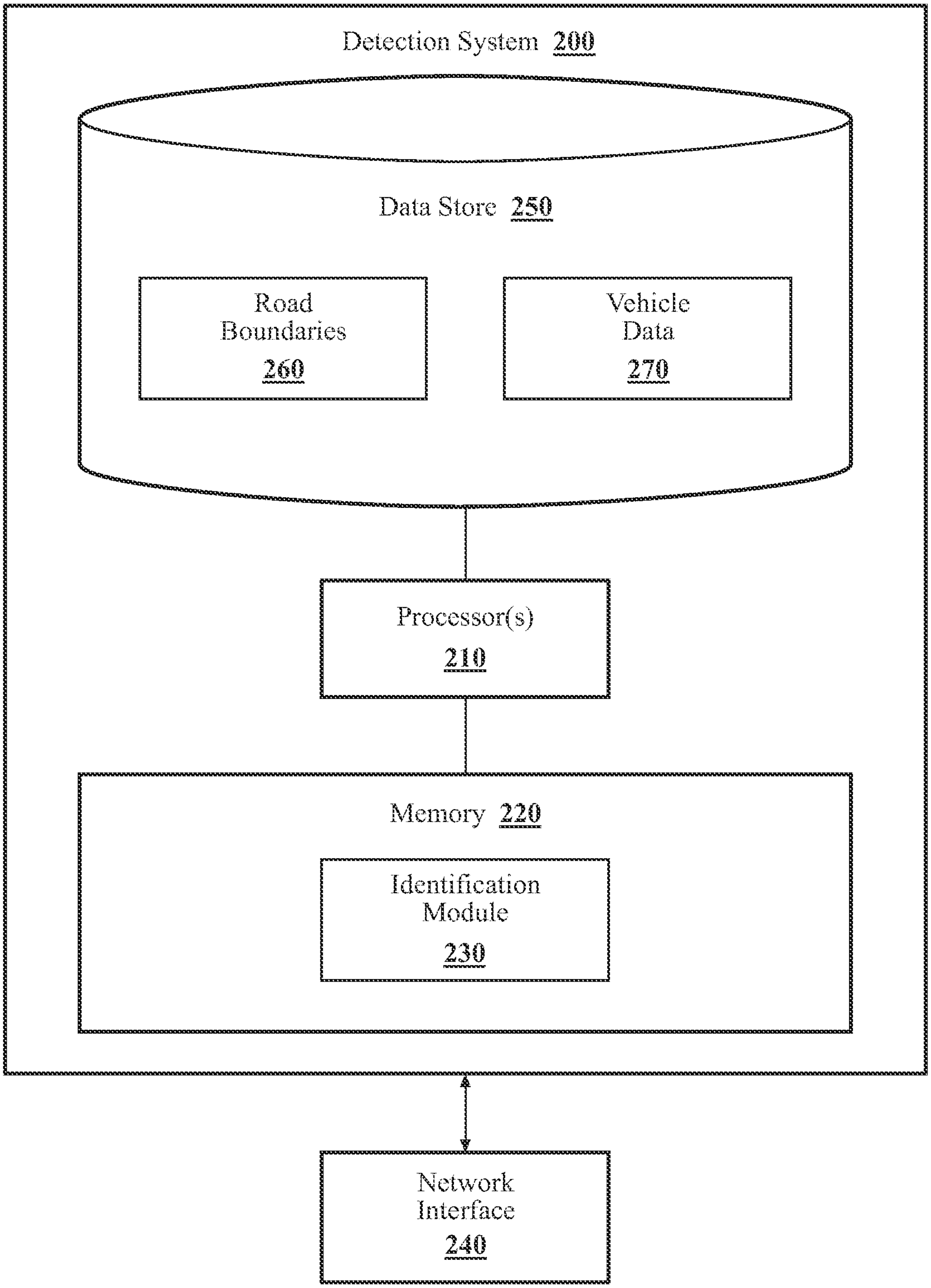
FIG. 2 illustrates one embodiment of a detection system that is associated with detecting a hard point between different roads using a sliding window for searching a raster representation of a road.

With reference to FIG. 2, one embodiment of the detection system 200 is further illustrated. The detection system 200, in various embodiments, is an abstract form of the detection system 200 that can be implemented using a cloud-based service, an edge server, a network server, etc. The detection system 200 can include a processor(s) 210 and a memory 220 that stores an identification module 230. The memory 220 is a random-access memory (RAM), a read-only memory (ROM), a hard-disk drive, a flash memory, or other suitable memory for storing the identification module 230. The identification module 230 is, for example, computer-readable instructions that when executed by the processor(s) 210 cause the processor(s) 210 to perform the various functions disclosed herein.

With reference to FIG. 2, the detection system 200 generally includes instructions that function to control the processor(s) 210 to receive data inputs from one or more sensors of the vehicle 100 over a network interface 240 (e.g., a wireless transceiver, a wireless protocol, etc.). Although examples reference the vehicle 100, the detection system 200 can acquire the vehicle data 270 from multiple vehicles, devices, networks, etc. Furthermore, the inputs are, in one embodiment, measurements of one or more objects (e.g., lane lines, road boundaries) in an environment proximate to the vehicle 100 and/or other aspects about the surroundings. As provided for herein, the detection system 200, in one embodiment, acquires the vehicle data 270 that includes at least images from a camera. In further arrangements, the detection system 200 acquires the vehicle data 270 from further sensors such as radar sensors 123, LIDAR sensors 124, and other sensors as may be suitable for identifying vehicles and locations of the vehicles. For instance, the vehicle data 270 is Toyota™ Safety Sense (TSS) data from a sensor system 120 having information about lane lines, road boundaries, road structure, etc.

Moreover, the vehicle 100 can undertake various approaches to fuse data from multiple sensors before communicating the sensor data 119 over the network interface 170 and/or from sensor data acquired over the network interface 170. As such, the vehicle data 270, in one embodiment, represents perception combinations acquired from multiple sensors. Furthermore, the vehicle data 270 may also include, for example, information about lane markings, remotely instructing the sensor system 120 to acquire the vehicle data 270 about an area, etc. In one approach, the vehicle data 270 includes information about a forward direction alone when, for example, the vehicle 100 lacks further sensors to include additional regions about the vehicle and/or the additional regions are not scanned due to other reasons.

In various implementations, the detection system 200 includes a data store 250. In one embodiment, the data store 250 is a database. The database is, in one embodiment, an electronic data structure stored in the memory 220 or another data store and that is configured with routines that can be executed by the processor(s) 210 for analyzing stored data, providing stored data, organizing stored data, and so on. Thus, in one embodiment, the data store 250 stores data used by the identification module 230 in executing various functions. In one embodiment, the data store 250 includes the vehicle data 270 along with, for example, metadata that characterize various aspects of sensor data. For example, the metadata can include location coordinates (e.g., longitude and latitude), relative map coordinates or tile identifiers, time/date stamps from when the separate vehicle data 270 was generated, and so on. As further explained below, the vehicle data 270 includes detected keypoints from a vehicle(s) that indicate geographical coordinates associated with specific points-of-interest. Such keypoints can be derived from data captured by the sensor system 120 (e.g., an image). Additionally, the vehicle data 270 can include positioning data received from a network (e.g., global positioning, base station coordinates, a network address, etc.) that the identification module 230 processes to derive information about road boundaries.

Figure 3A:
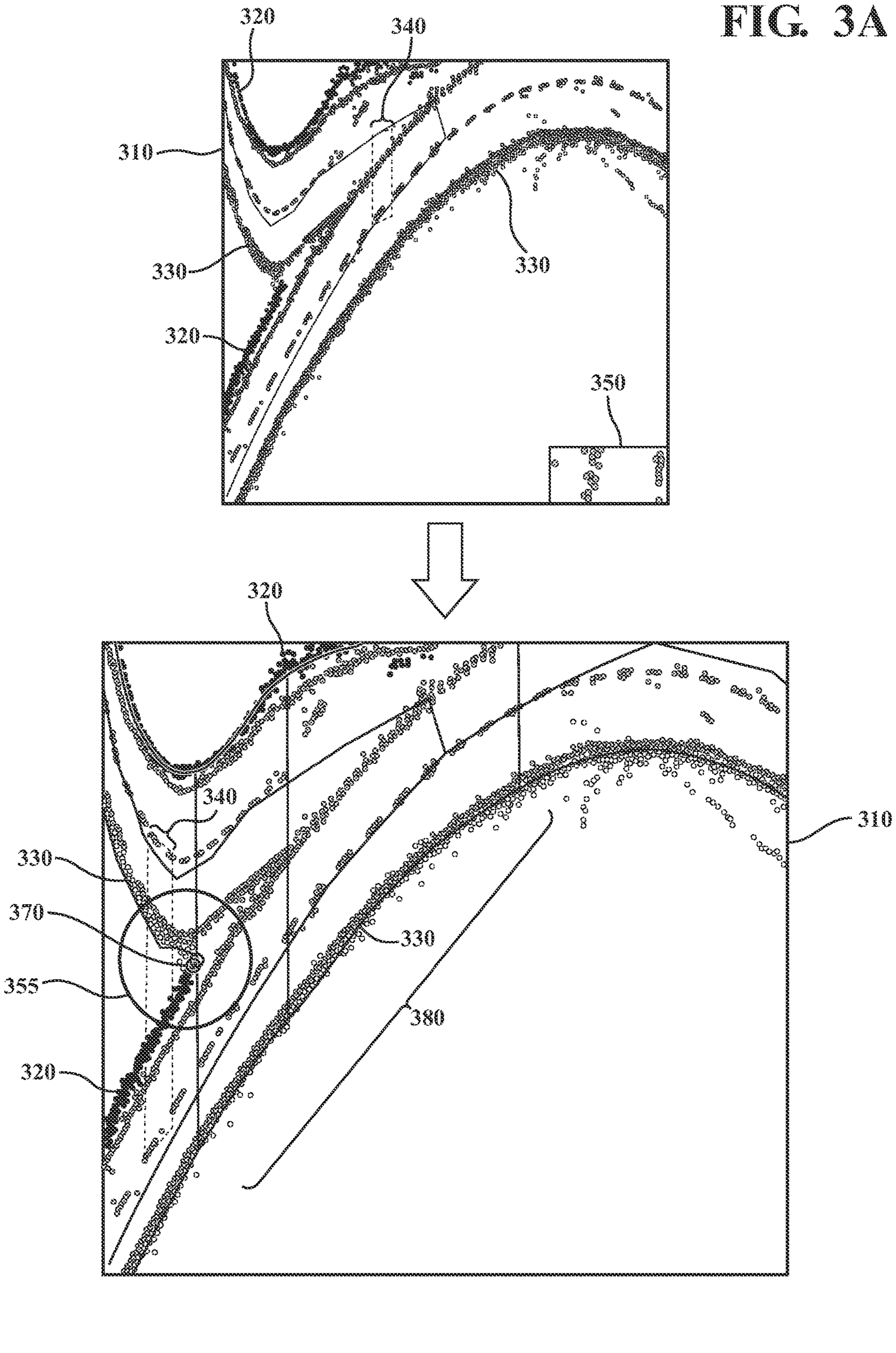
FIGS. 3A and 3B illustrate examples of the detection system from FIG. 2 searching the raster representation with the sliding window for the hard point according to a road structure.
Figure 3B:
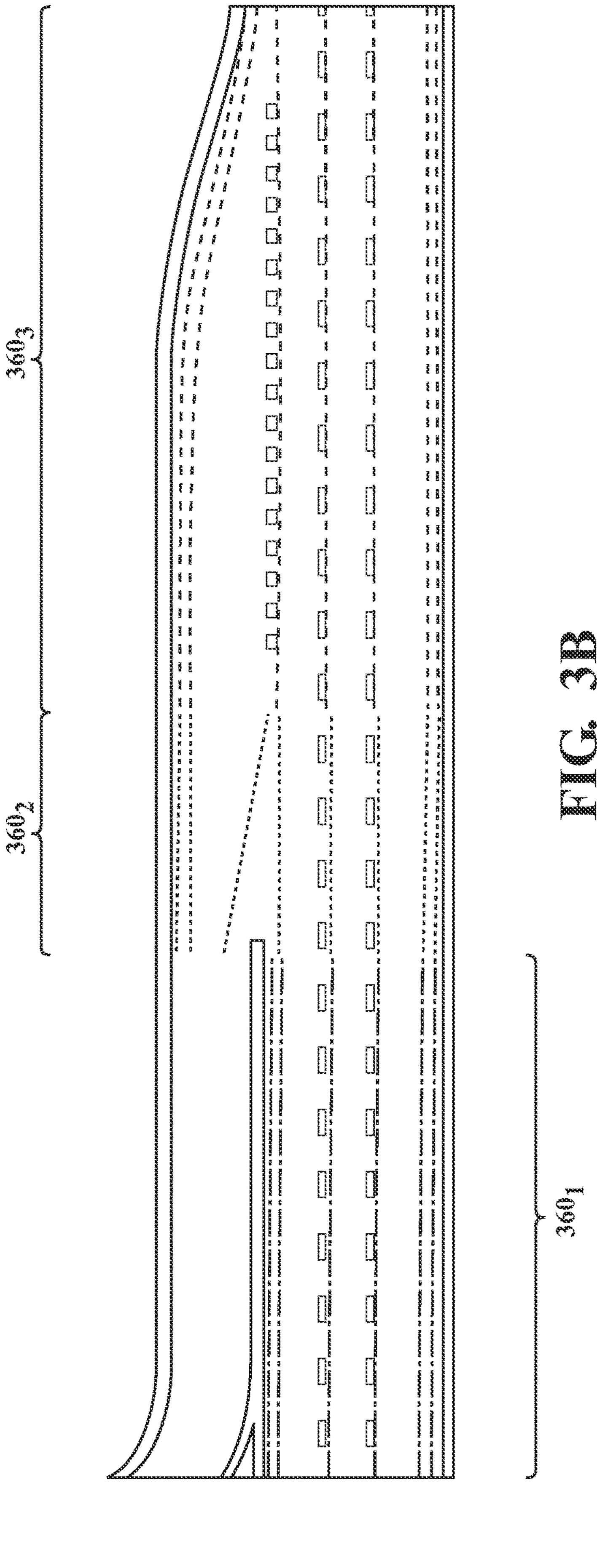

Now turning to FIGS. 3A and 3B, examples of the detection system 200 searching a raster representation with a sliding window for a hard point according to road information are illustrated. Here, the detection system 200 and the identification module 230 can include instructions that cause a processor(s) 210 to detect the hard point at a convergence area. Detecting the hard point allows the derivation of additional lane information since the hard point represents a fundamental point between roads. In one embodiment, the data store 250 includes road boundaries 260 that define physical (e.g., concrete), non-physical (painted), hard, soft, etc. boundaries between different roads and road edges. For example, the road boundaries 260 include coordinates of a left boundary 320 and a right boundary 330 associated with different roads merging at a junction on a road graph 310. As such, a left road and right road captured within the road graph 310 can individually be associated with the left boundary 320 and the right boundary 330.

Additionally, the road graph 310 may describe a layout of the different roads in an area derived from navigation, positioning, open source, etc. data. Furthermore, an identification module 230 can identify the road boundaries 260 from a raster representation generated with the vehicle data 270, such as with camera data acquired from the camera(s) 126. The raster representation may map keypoints having geographical coordinates detected from the vehicle data 270 of a vehicle(s) (e.g., a vehicle fleet) and include information about the left boundary 320 and the right boundary 330.

In one approach, rasterized keypoints are information derived by the detection system 200 from the vehicle data 270 and plotted in a colorized map such that a pixel has a corresponding latitude and longitude from the real world. A keypoint plot can suggest relationships such as a solid line within a certain distance of a dotted line being a road boundary. In this way, the identification module 230 identifies road boundaries through the visual representation of rasterization, logical patterns, and relationships between lane boundaries, lines, types, etc.

Subsequent to identifying the road boundaries 260, the detection system 200 can search the raster representation and the vehicle data 270 with a sliding window 340 for the hard point 370 using the road boundaries 260 and the road graph 310 as guides. In various implementations, a plot 350 tracks changes to locate a pattern and a cluster 355 of the keypoints within the sliding window 340 associated with detecting the hard point 370. As further explained below, the cluster 355 can indicate a meeting and intersection of lane boundaries signifying the hard point 370. In one approach, the searching includes locating lane groups associated with the different roads since the hard point 370 can mark a transition (e.g., merging, divergence, etc.) between lane groups. Here, a lane group can represent an area among the different roads having a road structure, lane types, lane quantities, etc. parameters that are constant. A new lane group can begin when a road structure, lane types, lane quantities, etc. substantially changes.

Regarding more on lane groups, FIG. 3B illustrates an example of lane groups $\mathbf{360}_1$-$\mathbf{360}_3$. Here, the lane group $\mathbf{360}_1$ has three lanes between road boundaries without including a merging lane. The lane group $\mathbf{360}_2$ differs from $\mathbf{360}_1$ since the merging lane (i.e., a new lane type) emerges in an area and combines with the three lanes between road boundaries, thereby changing parameters of the lane group $\mathbf{360}_1$. Furthermore, lane group $\mathbf{360}_3$ further changes parameters with the merging lane tapering with the three lanes between the road boundaries.

Concerning details about searching, the detection system 200 may search by graphing keypoints of the different roads by moving the sliding window 340 along center lines between the left boundary 320 and the right boundary 330. Here, the left boundary 320 and the right boundary 330 are individually associated with left and right roads within the road graph 310. In this way, the detection system 200 can generate the road graph 310 dynamically with the vehicle data 270. Furthermore, the sliding window 340 can find an end and a start of different lane groups among lane groups 380 for detecting the hard point 370. Here, the sliding window 340 is independent from lane information that defines the lane groups 380 although the sliding window 340 encounters the lane groups 380. Furthermore, in one embodiment, the sliding window 340 has a fixed, adaptive, flexible, etc. size while moving along center lines between the left boundary 320 and the right boundary 330, such as according to a road structure. For example, the sliding window 340 is a parallelogram that varies in length but has a fixed width to accurately track keypoints between the left boundary 320 and the right boundary 330.

While searching, the detection system 200 detects the hard point 370 at a convergence area between the left boundary 320 and the right boundary 330 among the sliding window 340. As such, the hard point 370 can represent a physical boundary and a road junction between the left boundary 320 and the right boundary 330 that is a significant transition. For instance, a significant transition is a four-lane highway as a first lane group diverging at a hard point and splitting into double two-lane roads as a second lane group. In one approach, the detection system 200 marks the hard point 370 on the raster representation where keypoint patterns and clusters associated with the left boundary 320 and the right boundary 330 separately for left and right roads transition (e.g., merging, diverging, etc.) into the lane groups 380. For example, the detection system 200 detects the hard point 370 by the sliding window 340 having the cluster 355 of keypoints meeting together for both the left boundary 320 and the right boundary 330. In other words, the detection system 200 detects the hard point 370 where the right boundary 330 of the left road and the left boundary 320 of the right road meet within the road graph 310.

In various implementations, a map generator subsequently adapts an area map and includes positional information about the hard point 370 and the corresponding junction. Adaptation can include shifting and restructuring to account for the junction. Accordingly, the detection system 200 detects the hard point 370, a merge between the left boundary 320 and the right boundary 330, and lane groups 380 starting from the hard point 370, thereby improving mapping details through enhancing road information.

Figure 4:
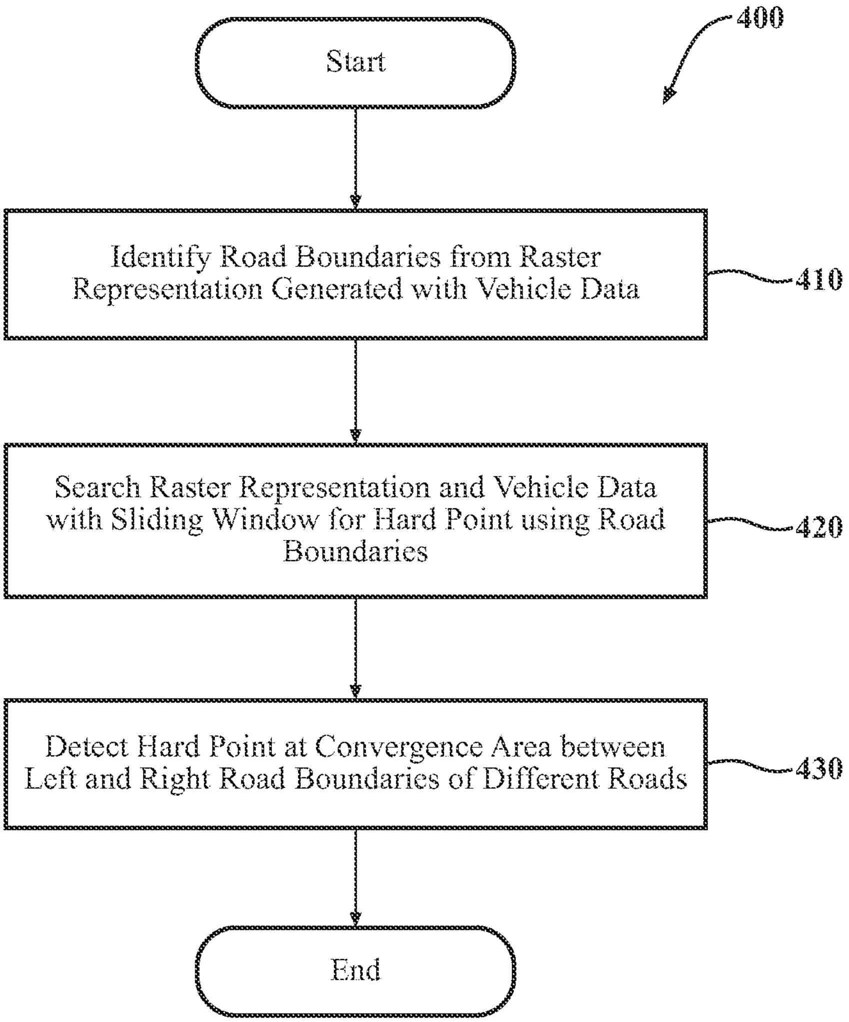
FIG. 4 illustrates one embodiment of a method that is associated with detecting the hard point at a convergence area between road boundaries using the sliding window.

Now turning to FIG. 4, one embodiment of a method 400 that is associated with detecting a hard point at a convergence area between road boundaries using a sliding window is illustrated. Method 400 will be discussed from the perspective of the detection system 200 of FIG. 2. While method 400 is discussed in combination with the detection system 200, it should be appreciated that the method 400 is not limited to being implemented within the detection system 200 but is instead one example of a system that may implement the method 400.

At 410, the identification module 230 identifies road boundaries from a raster representation generated with vehicle data. Here, the detection system 200 may acquire the vehicle data from a vehicle(s) in an area that includes images, radar data, LIDAR data, TSS data, etc. for determining information about lane lines, road boundaries, road structure, etc. The vehicle data can also include keypoints detected by the vehicle(s) that indicate geographical coordinates associated with specific points-of-interest. In one approach, the vehicle data includes positioning data received from a network (e.g., global positions, base station coordinates, etc.) that the identification module 230 processes to derive information about the road boundaries.

As previously explained, the raster representation can include mapped keypoints having geographical coordinates detected from the vehicle data of multiple vehicles. In this way, the identification module 230 can identify a left boundary, a right boundary, etc. from the keypoints and the geographical coordinates through the visual representation of rasterization and logical relationships. In one approach, rasterized keypoints are derived by the detection system 200 and plotted such that corresponding latitudes and longitudes from the real world are represented with pixels. Therefore, the identification module 230 can identify a road boundary from positional and structural differences between the keypoints of an area.

At 420, the detection system 200 searches the raster representation and the vehicle data with a sliding window for the hard point using the road boundaries. Here, the hard point can be a physical boundary at a road junction (merging, diverging, etc.) between different roads. In various implementations, the sliding window has a fixed, adaptive, flexible, etc. size while moving along center lines between a left boundary and a right boundary, such as following a road structure and keypoints. The left boundary and the right boundary may be physical (e.g., concrete), non-physical (painted), hard, soft, etc. road edges as boundaries.

The search, for example, includes locating a pattern and keypoint clusters within the sliding window, indicating a potential meeting of lane boundaries and the hard point. In one approach, searching identifies lane groups associated with the different roads from the hard point that can mark a transition (e.g., merging, divergence, etc.) between the lane groups. Furthermore, the sliding window can find an end and a start of different lane groups among the lane groups for detecting the hard point. Accordingly, mapping systems can dynamically adapt maps from detecting the hard point and finding the lane groups.

At 430, the detection system 200 detects the hard point at a convergence area between the left and the right road boundaries of the different roads. Here, a road junction can include the hard point that is a physical boundary between the left and the right road boundaries. As such, the hard point can represent a significant transition among lane groups. In one approach, the detection system 200 detects the hard point where a right boundary of a left road and a left boundary of a right road meet. Furthermore, in one embodiment, the hard point on the raster representation is a location where keypoint patterns and clusters are associated with the left boundary and the right boundary transition lane groups, such as through combinations. For example, a two-lane road and a one-lane road change lane groupings at a hard point by merging and becoming a three-lane road.

In various implementations, the hard point is detected by the detection system 200 with the sliding window having keypoint clusters meeting together for multiple road boundaries associated with the left and right roads. Here, clustering can improve detection through distinguishing significant keypoints from noise within a road graph. Furthermore, with the hard point and junction information, a map generator can adapt an area map and include positional information about the hard point and the junction. Thus, the detection system 200 improves mapping information by detecting hard points, junctions, and lane groups, thereby increasing safety for tasks relying on richer and detailed maps (e.g., automated driving).

Figure 5:
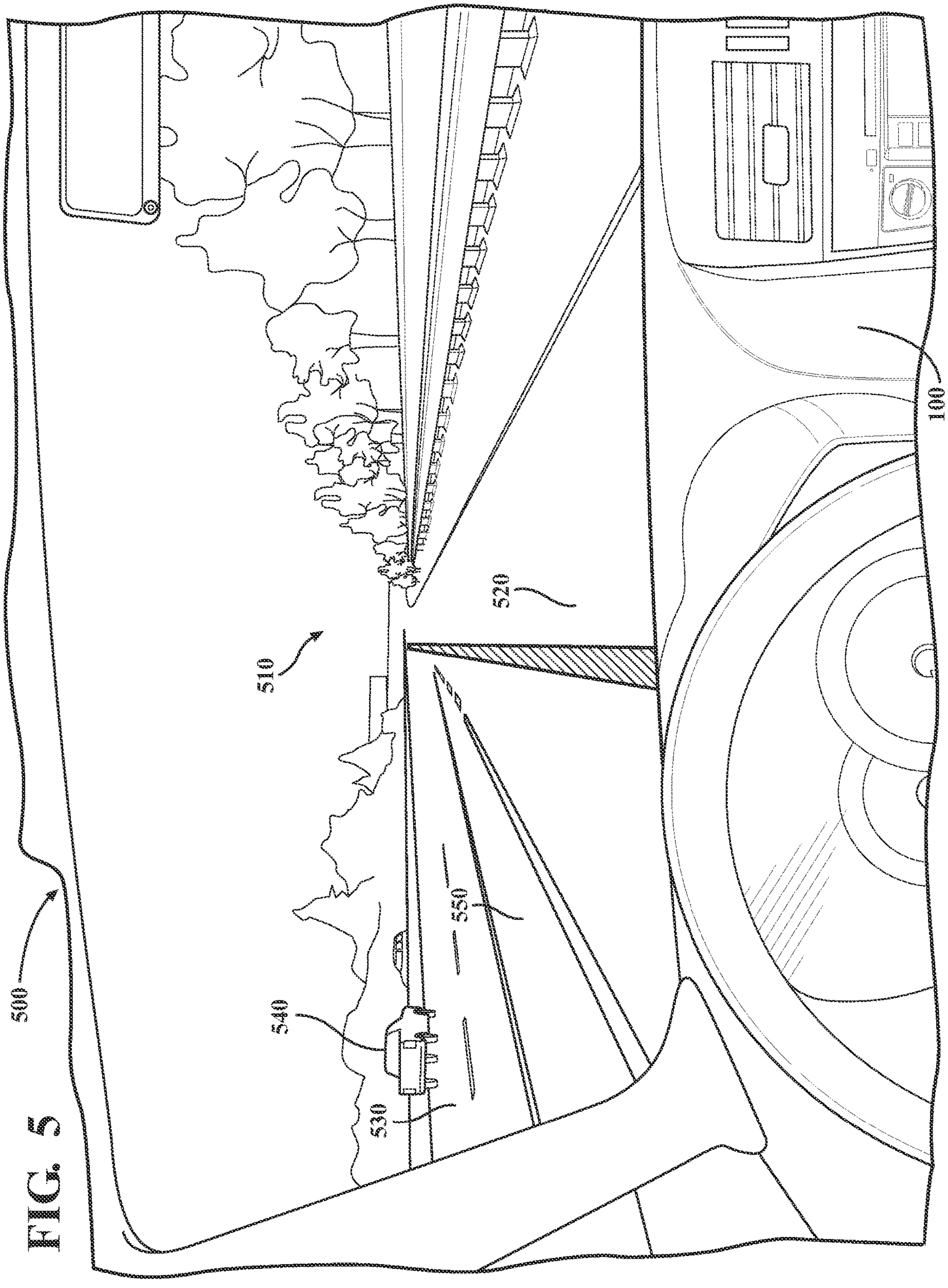
FIG. 5 illustrates a vehicle traveling within a driving environment using maps generated with the hard point and a junction derived with the detection system.

Referring to FIG. 5, a vehicle 100 traveling within a driving environment 510 using maps generated with a detected hard point and junction is illustrated in example 500. In FIG. 5, the vehicle 100 is traveling autonomously on a merging lane 520 and merging onto a road 530. Here, the road 530 includes a vehicle 540. The vehicle 100 receives a detailed map over the network interface 170 that indicates a hard point and a junction 550 between the merging lane 520 and the road 530. In particular, the map was generated by the identification module 230 identifying road boundaries and the detection system 200 using a sliding window to detect the hard point and the junction 550. In one approach, the merging lane 520 and the road 530 come together at the hard point and the junction 550 and form a new lane group having three lanes. Accordingly, the vehicle 100 autonomously merges onto the road 530 with increased reliability by having detailed information about the hard point and the junction 550, thereby improving road safety.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, programmable read-only memory (PROM), erasable programmable read-only memory (EPROM), electrically erasable programmable read-only memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate to the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110 and/or an automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the movement of the vehicle 100. The processor(s) 110 and/or the automated driving module(s) 160 may control some or all of the vehicle systems 140 and, thus, may be partially or fully autonomous as defined by the society of automotive engineers (SAE) levels 0 to 5.

The processor(s) 110 and/or the automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the movement of the vehicle 100. The processor(s) 110 and/or the automated driving module(s) 160 may control some or all of the vehicle systems 140.

The processor(s) 110 and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110 and/or the automated driving module(s) 160 can control the direction and/or speed of the vehicle 100. The processor(s) 110 and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 119. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A detection system comprising:

a memory storing instructions that, when executed by a processor, cause the processor to:

identify road boundaries from a raster representation about different roads generated with vehicle data, the road boundaries including a left boundary and a right boundary of the different roads, and the vehicle data includes keypoints for a road graph derived from sensor data and map data;

search the raster representation and the vehicle data with a sliding window for a hard point using the road boundaries and the road graph that describes a layout of the different roads; and detect the hard point at a convergence area between the left boundary and the right boundary among the sliding window and generate a map including the hard point, and maneuver a vehicle by a system with the map.

2. The detection system of claim 1, wherein the instructions to search the raster representation and the vehicle data further include instructions to:

locate lane groups associated with the different roads using the left boundary and the right boundary, wherein the lane groups represent areas among the different roads having one of a road structure, lane types, and lane quantities that have constant qualities.

3. The detection system of claim 2, wherein the instructions to detect the hard point further include instructions to:

mark the hard point on the raster representation where patterns associated with the lane groups transition by one of merging and diverging.

4. The detection system of claim 3, wherein the sliding window finds ending and starting points of the lane groups at the hard point.

5. The detection system of claim 3, wherein the sliding window is independent from lane information that defines the lane groups.

6. The detection system of claim 2, wherein the instructions to search the raster representation and the vehicle data further include instructions to:

graph the keypoints of the different roads with the road graph by moving the sliding window along center lines between the left boundary and the right boundary, wherein the road graph includes the keypoints and noise associated with the sensor data; and locate pattern changes and a cluster of the keypoints within the sliding window, wherein the left boundary and the right boundary meet in the cluster within the road graph and the sliding window.

7. The detection system of claim 2 further including instructions to adapt a size of the sliding window while the sliding window moves along center lines between the left boundary and the right boundary, wherein the sliding window is a parallelogram.

8. The detection system of claim 1, wherein the raster representation maps the keypoints having geographical coordinates detected from the vehicle data of a vehicle fleet and the raster representation includes the left boundary and the right boundary.

9. The detection system of claim 3, wherein:

the hard point is a physical boundary at a road junction of the different roads where the left boundary and the right boundary are associated with a merge; and a new lane group begins from a change in one of the road structure, the lane types, and the lane quantities.

10. A non-transitory computer-readable medium comprising:

instructions that when executed by a processor cause the processor to:

identify road boundaries from a raster representation about different roads generated with vehicle data, the road boundaries including a left boundary and a right boundary of the different roads, and the vehicle data includes keypoints for a road graph derived from sensor data and map data;

search the raster representation and the vehicle data with a sliding window for a hard point using the road boundaries and the road graph that describes a layout of the different roads; and detect the hard point at a convergence area between the left boundary and the right boundary among the sliding window and generate a map including the hard point, and maneuver a vehicle by a system with the map.

11. The non-transitory computer-readable medium of claim 10, wherein the instructions to search the raster representation and the vehicle data further include instructions to:

locate lane groups associated with the different roads using the left boundary and the right boundary, wherein the lane groups represent areas among the different roads having one of a road structure, lane types, and lane quantities that have constant qualities.

12. A method comprising:

identifying road boundaries from a raster representation about different roads generated with vehicle data, the road boundaries including a left boundary and a right boundary of the different roads, and the vehicle data includes keypoints for a road graph derived from sensor data and map data;

searching the raster representation and the vehicle data with a sliding window for a hard point using the road boundaries and the road graph describing a layout of the different roads; and detecting the hard point at a convergence area between the left boundary and the right boundary among the sliding window and generating a map including the hard point, and maneuvering a vehicle by a system with the map.

13. The method of claim 12, wherein searching the raster representation and the vehicle data further includes:

locating lane groups associated with the different roads using the left boundary and the right boundary, wherein the lane groups represent areas among the different roads having one of a road structure, lane types, and lane quantities that have constant qualities.

14. The method of claim 13, wherein detecting the hard point further includes:

marking the hard point on the raster representation where patterns associated with the lane groups transition by one of merging and diverging.

15. The method of claim 14, wherein the sliding window finds ending and starting points of the lane groups at the hard point.

16. The method of claim 14, wherein the sliding window is independent from lane information that defines the lane groups.

17. The method of claim 13, wherein searching the raster representation and the vehicle data further includes:

graphing the keypoints of the different roads with the road graph by moving the sliding window along center lines between the left boundary and the right boundary, wherein the road graph includes the keypoints and noise associated with the sensor data; and locating pattern changes and a cluster of the keypoints within the sliding window, wherein the left boundary and the right boundary meet in the cluster within the road graph and the sliding window.

18. The method of claim 13 further comprising adapting a size of the sliding window while the sliding window moves along center lines between the left boundary and the right boundary, wherein the sliding window is a parallelogram.

19. The method of claim 12, wherein the raster representation maps the keypoints having geographical coordinates detected from the vehicle data of a vehicle fleet and the raster representation includes the left boundary and the right boundary.

20. The method of claim 14, wherein:

the hard point is a physical boundary at a road junction of the different roads where the left boundary and the right boundary are associated with a merge; and a new lane group begins from a change in one of the road structure, the lane types, and the lane quantities.

* * * * *